Nov. 21, 1967  C. C. LAMAR  3,354,279
CONTROL APPARATUS
Filed Oct. 1, 1965
2 Sheets-Sheet 1
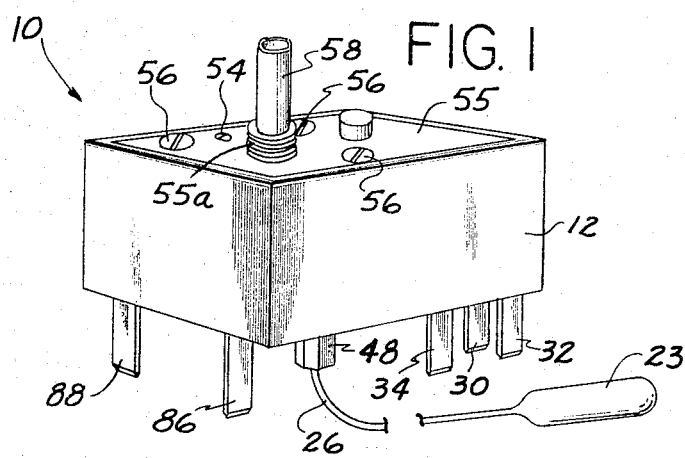
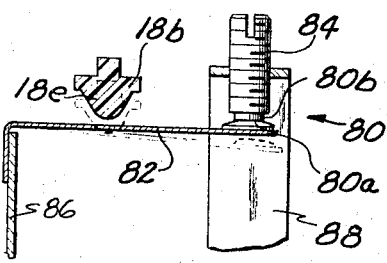
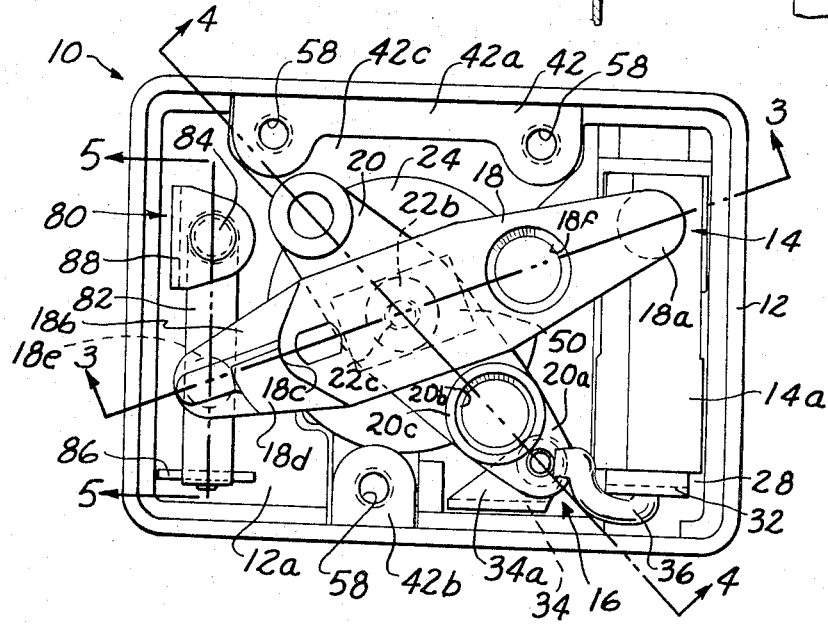
INVENTOR.
CHARLES C. LAMAR
BY Mason, Kolehmainen,
Rathburn & Wyss.
ATTORNEYS Nov. 21, 1967
C. C. LAMAR
3,354,279
CONTROL APPARATUS
Filed Oct. 1, 1965
2 Sheets-Sheet 2
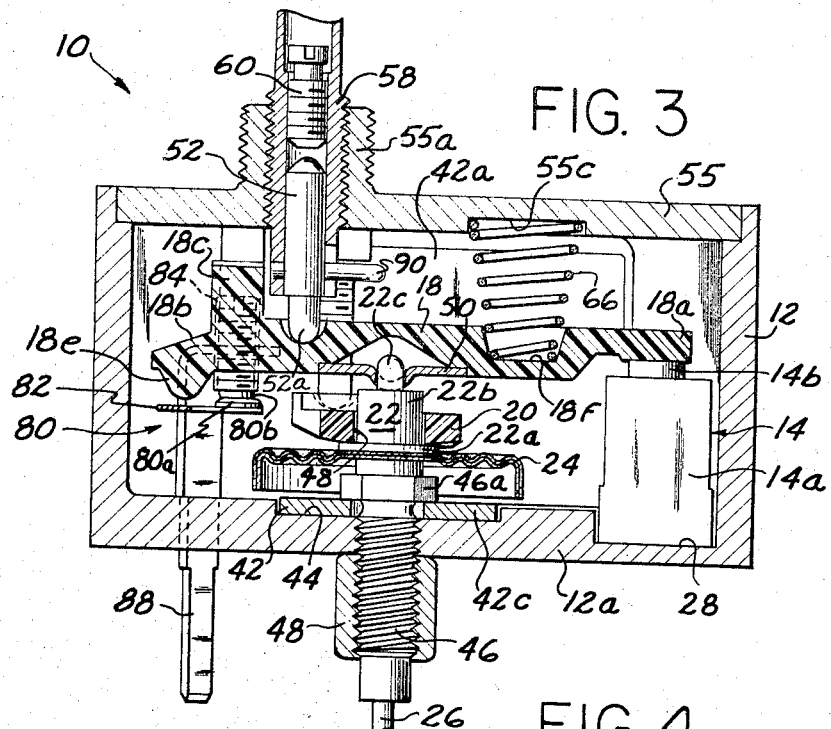
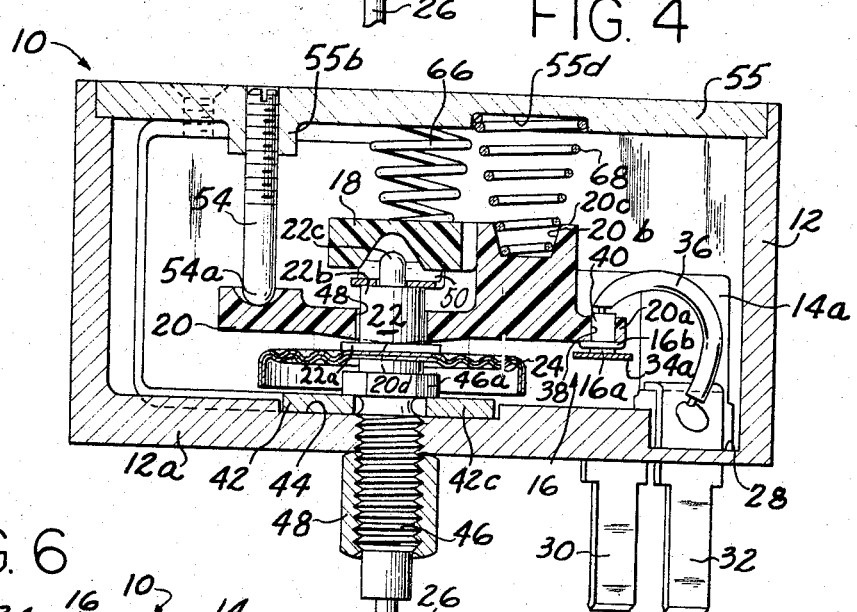
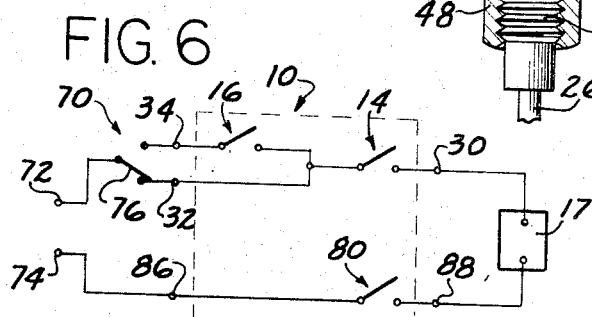
INVENTOR.
CHARLES C. LAMAR
BY Mason, Kolehmainen,
Rathburn & Wyss.
ATTORNEYS United States Patent Office 3,354,279
Patented Nov. 21, 1967

3,354,279
CONTROL APPARATUS
Charles C. Lamar, Chicago, Ill., assignor to Harper-Wyman Company, Hinsdale, Ill., a corporation of Illinois
Filed Oct. 1, 1965, Ser. No. 492,220
10 Claims. (Cl. 200—140)

ABSTRACT OF THE DISCLOSURE

A dual range thermostatic oven control includes a rectangular housing with a pair of overlapping lever arms for operating a pair of switches in the housing. An expansible diaphragm in the housing carries a power member simultaneously engaging central portions of both levers for moving both levers in response to temperature changes. An adjustable pivot controlled by a knob positions one of the levers for operation of one switch at a selected cooking temperature in the range of 140° F. to 600° F. An adjustable pivot positions the other lever for operation of the other switch at a keep warm temperature of about 170° F. A circuit including a timer controlled switch initially places the cooking temperature switch in series with an electrically operated gas valve for operation at a cooking temperature. For keep warm operation, both switches are placed in series with the valve. When the knob is turned to an off position, the cooking temperature switch and an additional switch are opened by a cam and follower arrangement to disconnect the valve from both sides of the power supply.

---

The present invention relates to control apparatus and more particularly to a novel dual range temperature control.

In many applications of control apparatus it is desirable to achieve dual range or multi-range operation of control devices, such as switches or valves, and to cause each control device to operate at a particular condition, such as a particular temperature or pressure. For example, in a thermostatic oven control, it may be desirable to provide a single control apparatus capable of controlling both a higher temperature cooking operation and a lower temperature keep-warm operation.

Heretofore, such dual range controls for ovens and the like have been complex in construction and large in size. Accordingly, it is an important object of the present invention to provide a novel dual range control of compact and simplified design.

It is a further object of the invention to provide a dual range control characterized by a novel simplified arrangement for controlling operations at different conditions including a single condition responsive actuating member.

Another object is to provide a compact and simplified arrangement of operating arms or levers, control devices and adjustment means in a dual range control.

It is yet another object to provide an improved dual range control of simplified and compact design capable of dual range operation in overlapping first and second ranges of operation.

It is still another object of the invention to provide a dual range electric thermostatic control including novel means for disconnecting both sides of the power source from a load controlled by the thermostatic control when the control is in the off position, thereby to insure complete isolation of the load in the off position.

In brief, the control apparatus of the present invention includes a pair of switches adapted selectively to be connected to control a load such as a solenoid operated oven gas valve, one switch for controlling the valve at any desired cooking temperature within a wide range of temperatures and the other at a low keep-warm temperature. Each switch is controlled by means of an operating arm or lever having one portion engageable with the switch. Other portions of the levers are engageable with a pair of pivots movably mounted for adjusting the positions of the levers and thus for adjusting the temperatures of operation of the respective switches.

These pivots may be adjusted independently of one another, and a wide rage of cooking temperature operation is possible since the corresponding pivot can be set for operation of the cooking temperature controlling switch at temperatures below, above or equal to the keep-warm temperature selected.

In order to minimize the size and complexity of the control apparatus and in accordance with an important feature of the invention, the levers are crossed intermediate their ends so that they can be arranged generally diagonally within a small rectangular housing. Furthermore, both levers are moved in response to temperature change by means of a single temperature responsive element conveniently engageable with the levers at the crossing point.

The control apparatus may include an additional switch operated when the control is turned to off. The adjusting means for the cooking temperature control lever comprises a threaded shaft rotatable to select a desired cooking temperature. When a knob on the shaft is turned to an off position, a pin on the shaft engages a cam surface on the lever forcing the lever to an off position spaced from the cooking temperature switch, and a protuberance on the lever engages and opens the additional off switch. The cooking temperature switch and the off switch may be connected between the load and both sides of the power supply so that in the off position the load is entirely isolated from the power supply.

Other objects and advantages of the present invention will become apparent from the ensuing description of an illustrative embodiment in the course of which reference is had to the accompanying drawings, in which:

FIG. 1 is an isometric view of a dual range control constructed in accordance with the present invention;

FIG. 2 is an enlarged top elevational view of the control of FIG. 1 with the cover plate and other structure removed;

FIG. 3 is a sectional view taken along the line 3—3 of FIG. 2, assuming FIG. 2 to show the complete structure;

FIG. 4 is a sectional view taken along the line 4—4 of FIG. 2, assuming FIG. 2 to show the complete structure;

FIG. 5 is a fragmentary sectional view taken along the line 5—5 of FIG. 2; and

FIG. 6 is a schematic diagram of an oven controlling circuit including the control of FIG. 1.

Having reference now to the drawings and initially to FIG. 1, there is illustrated a dual range control device constructed in accordance with the present invention and indicated generally as 10. The dual range control 10 includes a generally rectangular housing or casing 12, and at one end of the housing 12 are located a pair of switches generally designated as 14 and 16. When the control 10 is used for controlling the temperature of an oven, the switch 14 controls an initial cooking operation at a desired temperature within a range of possible temperatures which may extend, for example, from 140° F. to 600° F. The switch 16 controls a subsequent keep-warm operation at a relatively low temperature, such as 170° F. Thus, as will be described hereinafter, the switches 14 and 16 are normally consecutively connected in controlling relation to a load such as a solenoid operated gas valve 17 illustrated schematically in FIG. 6.

Operations of the cooking temperature switch 14 and the keep-warm switch 16 are controlled respectively by a pivotally mounted cooking temperature lever 18 and a pivotally mounted keep-warm lever 20. In accordance with an important feature of the invention the levers or operating arms 18 and 20 are mounted in crossed configuration in the casing 12, thus requiring a minimum of space.

Furthermore, the crossed lever arm configuration allows simplified dual range control with a single heat responsive member 22 movable in response to temperature change (FIGS. 3 and 4). In order to effect movement of the levers 18 and 20 in response to temperature change in the oven being controlled, the control 10 includes a temperature sensing bulb 23 to be mounted in heat sensing relation in or near the oven. The bulb 23 contains a thermally expanding fluid, and is connected by a capillary tube 26, in hermetically sealed relation to a diaphragm 24 of known construction whereby oven tempearture change results in expansion or contraction of the diaphragm 24. This movement is transmitted to both operating arms 18 and 20 by means of the single member 22 mounted to the diaphragm 24 and engaging the arms 18 and 20 at their crossing central portions in a manner to be described hereinafter.

Proceeding now to a description of the construction of the control 10, the casing 12 comprises a generally rectangular open-sided box and may be formed of molded plastic. The cooking temperature switch 14 in the illustrated embodiment is of the so-called miniature switch type and includes a housing 14a received in a recess 28 in a bottom wall 12a of the casing 12 (FIG. 3). Within the housing 14a are suitably arranged elements of a normally open snap-acting single pole switch adapted to be closed by depression of a switch controlling button 14b. A pair of plug-in terminals 30 and 32 serve to connect the switch 14 in a controlling circuit, such as the circuit illustrated in FIG. 6.

In high resistance circuit applications, if desired, the switch 14 may be a less expensive slow make and break switch.

Switch 16 comprises a pair of contacts 16a and 16b, the contact 16a being mounted on a portion 34a of a plug-in terminal 34. The switch contact 16b is connected by means of a conductor 36 to the terminal 32.

Levers 18 and 20 include switch operating ends 18a and 20a aligned with the switches 14 and 16. Thus, the cooking temperature switch 14 is moved to its closed position when the end 18a of the cooking temperature lever moves downwardly and depresses the switch button 14b. The switch operating end 20a of the keep-warm lever 20 includes an opening 38 carrying a conductive insert 40 interconnecting the contact 16b and conductor 36. Thus, switch 16 is closed when the lever 20 moves downwardly until contact 16b engages the fixed contact 16a.

Movement of the levers 18 and 20 in response to oven temperature change is accomplished by the sensing bulb 23, diaphragm 24 and single movable member 22. Mounted within the casing 12 a supporting frame 42 having a pair of spaced legs 42a and 42b at the sides of the casing 12 (FIG. 2), and having a base 42c positioned in a recess 44 in the closed side wall 12a of the casing. The conduit 26 is joined to a threaded connector 46 having a flange 46a held against the base 42c of frame 42 by a threaded fastener 48, also serving to hold the frame 42 in the casing 12. The diaphragm 24 is mounted to the inwardly extending end of connector 46 in communication with the bulb 23, and the single movable member 22 is mounted for heat responsive movement on the top of the diaphragm 24 in a direction normal to the wall 12a.

In order to actuate both levers 18 and 20, the heat responsive member 22 includes a wide base portion 22a and an intermediate width portion 22b extending through an opening 48 defined in the central part of lever 20. Thus the portion 22a forms a shoulder engaging a pivot ridge 20d formed at the bottom of lever 20 (FIG. 4) whereby movement of element 22 causes movement of the lever 20. The central part of lever 18 defines a rectangular recess carrying a bimetallic ambient temperature compensating pivot plate 50 having an opening at the center thereof for receiving a positioning protuberance 22c of the member 22. The intermediate width portion 22b of member 22 forms a shoulder for transmitting movement of the member 22 to the lever 18.

Temperature changes sensed by the bulb 23 thus cause levers 18 and 20 to move and to open and close switches 14 and 16 at desired temperatures. The temperatures at which switches 14 and 16 are operated by levers 18 and 20 may be selected by adjusting the positions of a pair of pivots 52a and 54a engageable with the levers. The casing 12 is provided with a cover plate 55 held in place by means of screws 56 threaded into openings 58 in the support frame legs 42a and 42b. For selecting a desired cooking temperature, a cooking temperature adjustment shaft 58 is threaded into a boss 55a on the cover plate 55. The inward end of shaft 58 carries a plug 52, the end of which comprises the cooking temperature pivot 52a. The relative position of the plug 52 with respect to the shaft 58 is adjustable by means of an assembly 60 within shaft 58 to give accurate oven cooking temperature control in a desired range of temperatures. When a suitable knob is mounted on the shaft 58, rotation thereof causes the pivot 52a to move inwardly or outwardy to determine the position of lever 18, and thus determine the temperature at which switch 14 will be operated.

Similarly, the cover plate 55 includes an internally threaded boss 55b carrying a keep-warm temperature adjustment shaft 54 the end of which comprises the pivot 54a. The shaft 54 may be factory adjusted to a position giving a suitable low keep-warm temperature, such as about 170° F.

Alternatively, the shaft 54 may be provided with a suitable knob located outside the casing 12 whereby the keep-warm temperature could be adjusted by the user.

To hold the levers 18 and 20 in place against the switchs 14 and 16, element 22 and pivots 52a and 54a, a pair of springs 66 and 68 extend between the cover plate 55 and the levers. Spring 66 extends between a positioning recess 55c in the cover plate and an aligned recess 18f in the cooking temperature lever 18. Spring 68 similarly extends between a recess 55d in the cover plate 55 and a recess 20b in the keep-warm arm. To allow the springs 66 and 68 to be similar in construction and length, lever 20 is provided with an upraised portion 20c defining the recess 20b at the same distance from the cover plate 55 as the recess 18f in lever 18.

Having reference now to FIG. 6, there is illustrated a circuit generally designated as 70 including the control 10 of the present invention. The circuit 70 includes a pair of terminals 72 and 74 for connection to a suitable source of electric power. Furthermore, the circuit includes a double throw switch 76 for interconnecting the power supply terminal 72 with either the terminal 34 or the terminal 32 of the control 10, to select either a cooking cycle or a keep-warm cycle. For example, the switch 76 may be a clock controlled switch whereby a complete operation including a cooking temperature cycle automatically followed by a keep-warm cycle may be programmed.

The operation of the control 10 in the circuit 70 will be readily apparent to those skilled in the art from the above description. At the beginning of a cooking cycle, the switch 76 is positioned as illustrated in FIG. 6 to connect the terminal 72 with the terminal 32 of the control 10. Initially the oven temperature is cool so that the temperature responsive member 22 is in its illustrated position on the collapsed diaphragm 24 (FIGS. 3 and 4), and the arm 18 depresses the switch button 14b thus closing the switch 14 and completing the circuit to the solenoid operated gas valve 17 whereby oven heat is produced and oven temperature rises. When the oven temperature rises to the desired cooking temperature as determined by the position of the temperature control shaft 58 and pivot 52a, the member 22 moves the cooking control lever 18 away from the switch button 14b, thus allowing the switch 14 to open and disconnect the supply of gas to the oven. Thereafter the switch 14 will cycle at the desired cooking temperature as long as the switch 76 remains in the illustrated position.

At the end of the cooking temperature cycle the switch 76 is moved to its alternative position and the power terminal 72 is connected to the terminal 34 of the control 10. Thus the switch 16 is now in series with the switch 14 and with the solenoid operated gas valve 17. Since the temperature in the oven at the end of the cooking cycle during a normal cooking operation is above the keep-warm temperature of about 170°, the member 22 holds the lever 20 so that the switch contacts 16a and 16b are open, thus cutting off the supply of gas to the oven. When the temperature falls to the desired keep-warm temperature, the lever 20 moves with the element 22 on the collapsing diaphragm 24 until the switch 16 is closed, completing the circuit to the solenoid operated valve 17. Thereafter the switch 16 will cycle at the desired keep-warm temperature. During the keep-warm cycle, the switch 14 is continually closed, assuming the selected keep-warm temperature is below the selected cooking temperature.

In accordance with a feature of the invention, the range of cooking temperatures overlaps the range of keep-warm temperatures. Thus, while the keep-warm temperature as determined by the position of pivot 54a is usually approximately 170° F., the cooking temperature may be adjusted by rotation of the shaft 58 to any temperature in a range extending both above and below the keep-warm temperature—for example, from 140° F. to 600° F.

If a cooking temperature below the keep-warm temperature is selected, the control 10 functions to maintain the oven at the lower cooking temperature throughout the entire cooking operation. Thus, when the switch 76 is moved to what is normally the keep-warm position interconnecting the terminal 34 and power terminal 72, switches 14 and 16 are arranged in series with the solenoid valve 17. Since in this condition the cooking temperature switch 16 opens at the low cooking temperature, this switch will control during the keep-warm operation as well as during the cooking operation. In this manner it is assured that the temperature in the oven never exceeds the selected cooking temperature.

From the above, it will be appreciated that the novel cross lever arm configuration of the control 10 constructed in accordance with the invention provides a simplified and compact arrangement whereby the levers 18 and 20 are disposed substantially along the diagonals of the rectangular casing 12 thereby requiring a minimum amount of space. Furthermore, the crossed lever arm configuration allows the single heat responsive member 22 to contact both levers 18 and 20 in a convenient fashion at the point where they cross. Thus a complicated interconnection of diaphragm and levers is avoided by the present invention.

In some applications of the control device 10, it may be desired to effect complete isolation of the load 17 from the power supply when the thermostat is turned to the off position. Thus the control 10 includes an additional switch generally designated as 80 (FIGS. 3, 5 and 6) adapted to be opened along with the switch 14 when the cooking temperature adjustment shaft 58 is turned to an off position. Accordingly, both sides of the load are disconnected from the power supply. The switch 80 includes a movable contact 80a and a fixed contact 80b mounted respectively on a flexible arm 82 and on an adjustment pin 84. The flexible arm 82 is mounted to a plug-in terminal 86 extending from the control 10 while the adjustment pin 84 is mounted to another plug-in terminal 88 also extending from the control 10. The spring action of the flexible arm 82 acts to hold the switch 80 in a normally closed position during operation of the control 10.

An end 18b of the cooking temperature control lever 18 includes an upraised portion 18c upon which is formed an inclined cam surface 18d (FIGS. 2 and 3). When the cooking temperature adjustment shaft 58 is rotated to an off position, a pin 90 mounted on the plug 52 rotates into engagement with the cam surface 18d moving the end 18b of the lever 18 to a position where the end 18a of the lever 18 remains spaced from the switch button 14b for all sensed temperature. Thus, in the off position, the switch 14 remains open regardless of the oven temperature, and since switch 14 is always in series with the load 17, the load is disconnected from power terminal 72 when the control is turned to off.

Furthermore, the end 18b of the cooking temperature control lever 18 includes an extending protuberance 18e arranged in alignment with the flexible arm 82 of the switch 80. In the off position, the protuberance 18e moves the switch arm 82 from its normal position to the open position of the switch illustrated in dotted lines in FIG. 5. Thus it can be seen that in the off position, both switches 14 and 80 are held in the open position thus isolating the load 17 from both power supply terminals 72 and 74.

If it is not desired to isolate both power terminals 72 and 74 from the load 17, the switch 80 may be omitted from the control 10, as may be the cam surface 18d and the protuberance 18e on the cooking temperature lever 18. In this case, the cooking temperature control shaft 58 and plug 52 are adjusted so that the pivot 52a holds the lever 18 spaced from the switch 14 for all temperatures in the off position. Thus, even though the switch 80 is replaced with a closed circuit connecting power terminal 74 and the load 17, when the control 10 is in the off condition, the load 17 is isolated from terminal 72 by the open switch 14.

While the present invention has been described in connection with details of a specific embodiment thereof, it should be understood that such details are not intended to be limitative of the invention except insofar as set forth in the claims. For example, the principles of the invention could be applied by one skilled in the art to devices for controlling conditions other than temperature such as pressure or the like and could be used with specific control devices other than the switches 14 and 16, such as flow controlling valves.

What is claimed as new and desired to be secured by Letters Patent of the United States is:

1. A control comprising a generally rectangular housing, a pair of control devices mounted in said housing adjacent first and second corners of said housing, pivot means mounted in said housing adjacent third and fourth corners of said housing, a crossed pair of lever arms disposed approximately along the diagonals of said housing, each of said lever arms extending between one of said control devices and said pivot means, and condition responsive means in said housing for moving said levers to operate said control devices.

2. A control comprising a generally rectangular housing, a pair of control devices mounted in said housing adjacent first and second corners of said housing, a pair of pivot members mounted in said housing adjacent third and fourth corners of said housing, a crossed pair of operating arms disposed approximately along the diagonals of said housing, each of said operating arms extending between one of said control devices and one of said pivot members, and condition responsive means supported in said housing adjacent the center thereof and simultaneously engaging said operating arms for moving said operating arms with respect to said control devices in order to operate said control devices.

3. A dual range control comprising a generally rectangular housing, a pair of control devices supported by said housing adjacent one end thereof, a pair of pivots supported by said housing adjacent the opposite end thereof, a crossed pair of operating arms disposed approximately along the diagonals of said housing, each of said operating arms extending between one of said control devices and one of said pivots, condition responsive means in said housing adjacent the center thereof simultaneously engaging said operating arms for moving said operating arms to operate said control devices at different conditions, adjustment means for moving one of said pair of pivots for selecting the condition for operation of the corresponding control device, a cam surface on the corresponding operating arm, a cam follower coupled to said adjustment means and engaging said cam surface for moving said corresponding operating arm to an off position, an additional control device near said other end of said housing, and means supported on said corresponding operating arm for operating said additional control device in the off position of said corresponding operating arm.

4. A dual range control device comprising a housing, first and second levers in said housing having overlapping central portions, condition responsive means movable in response to condition changes and simultaneously engaging the central portions of said first and second levers, a first pivot member spaced from said condition responsive means and supporting said first lever for pivotal movement about said first pivot member in response to condition change, a first control device controlled by said first lever and operated at a condition determined by the position of said first pivot member, a second pivot member spaced from said condition responsive means and supporting said second lever for pivotal movement about said second pivot member in response to condition change, and a second control device controlled by said second lever and operated at a condition determined by the position of said second pivot member.

5. A dual range control device as claimed in claim 4, said first pivot member and said first control device being supported within said housing adjacent opposite ends of said first lever, said second pivot member and said second control device being supported in said housing adjacent opposite ends of said second lever.

6. A dual range control device as claimed in claim 4, said levers comprising narrow elongated crossed arms overlapping only at their central portions.

7. Dual range thermostatic control apparatus for use with oven heating means comprising a housing, first and second levers in said housing and having overlapping central portions, heat responsive means mounted in said housing and simultaneously engaging said overlapping central portions of first and second levers, a first pivot member spaced from said heat responsive means and supporting said first lever for pivotal movement about said first pivot member in responsive to temperature changes, a first switch controlled by said first lever and operated from an open to a closed condition at a temperature determined by the position of said first pivot member, a second pivot member spaced from said heat responsive means and supporting said second lever for pivotal movement about said second pivot member in response to temperature changes, and a second switch controlled by said second level and operated from an open to a closed condition at a temperature determined by the position of said second pivot member.

8. The apparatus of claim 7, said first pivot member mounted in said housing in a position resulting in operation of said first switch at a relatively low keep-warm temperature, and manually operable adjustment means for moving said second pivot member through a range of cooking temperature positions between a low temperature position wherein said second switch is operated at a temperature lower than said keep-warm temperature and a high temperature position wherein said second switch is operated at a temperature higher than said keep warm temperature.

9. The apparatus of claim 8, further comprising circuit means connecting the over heating means in series with said second switch for normal operation of the oven heating means at a selected cooking temperature, and time controlled switch means for connecting said first switch in series with said second switch after a predetermined time.

10. Apparatus for controlling sequential cooking and keep-warm operations in an oven and adapted for use with electrically controlled oven heating means and timer controlled switching means, said apparatus comprising a housing, a cooking temperature switch and a keep-warm temperature switch supported in the housing, a pair of levers in said housing having overlapping central portions, one end of each lever being operatively connected to one of said switches to control the operation thereof, a pair of pivot members in said housing supporting the opposite ends of said levers, an oven heat responsive member supported in said housing and simultaneously engaging the overlapping central portions of said levers for moving said levers in response to changes in over temperature, and circuit means controlled by the timer controlled switching means for placing said cooking temperature switch in series with the electrically controlled oven heating means during a cooking period and for placing both the cooking temperature switch and the keep warm temperature switch in series with the electrically controlled oven heating means during a subsequent keep warm period.

References Cited
UNITED STATES PATENTS

| | | | |
|---|---|---|---|
| 2,314,211 | 3/1943 | Hausler | 200—140 |
| 2,525,501 | 10/1950 | Taylor | 200—50 X |
| 2,901,578 | 8/1959 | Noakes | 200—140 |
| 3,268,695 | 8/1966 | Douglas | 200—140 |

BERNARD A. GILHEANY, *Primary Examiner.*

H. B. GILSON, *Assistant Examiner.*